May 5, 1953 D. B. McILVIN ET AL 2,637,193
THROUGH-FEED MACHINE FOR TREATING SHEET MATERIALS
Filed Aug. 7, 1951 7 Sheets-Sheet 1

Inventors
Donald B. McIlvin
Arthur R. Abbott
By their Attorney
Thomas J. Ryan.

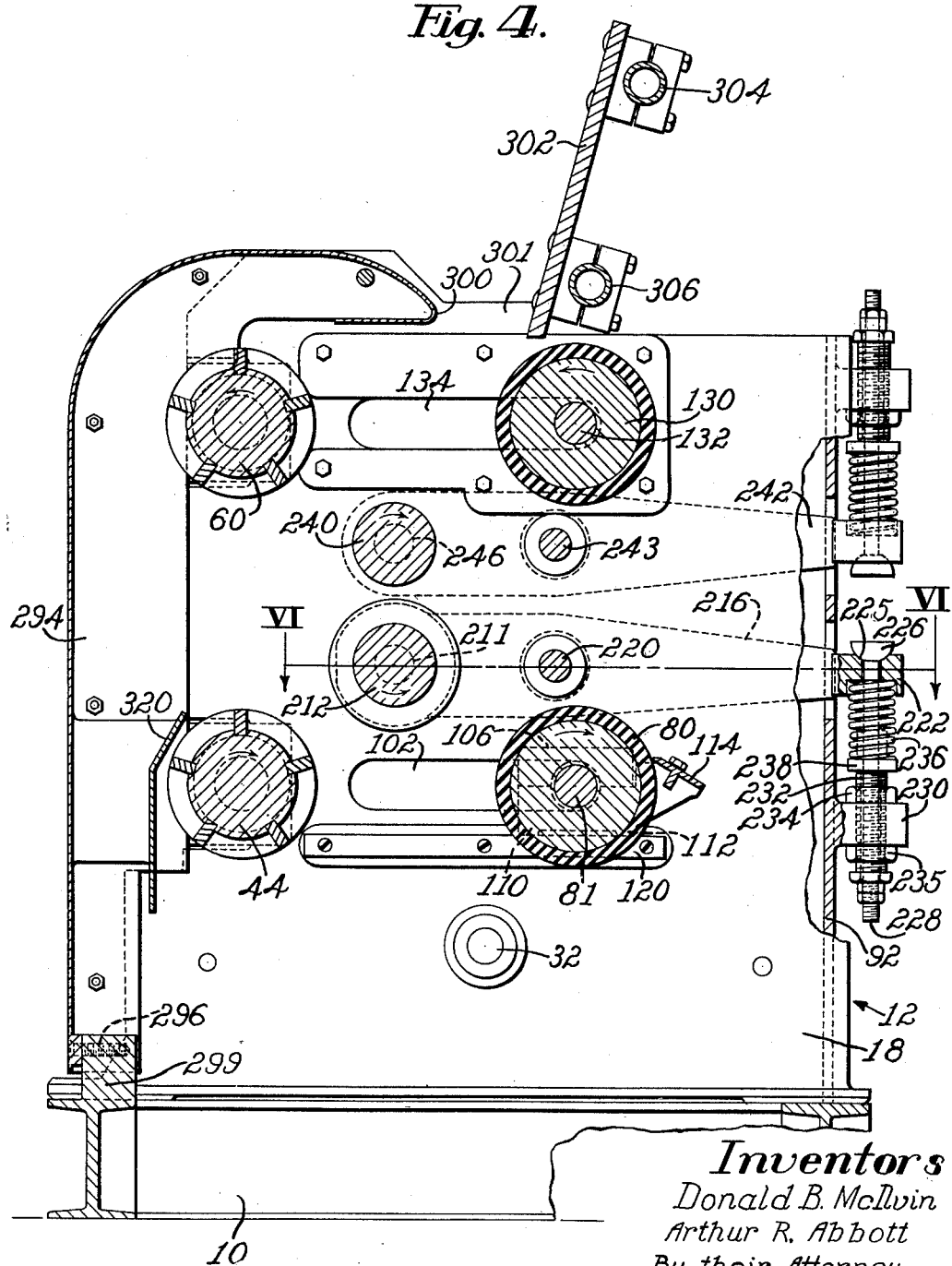

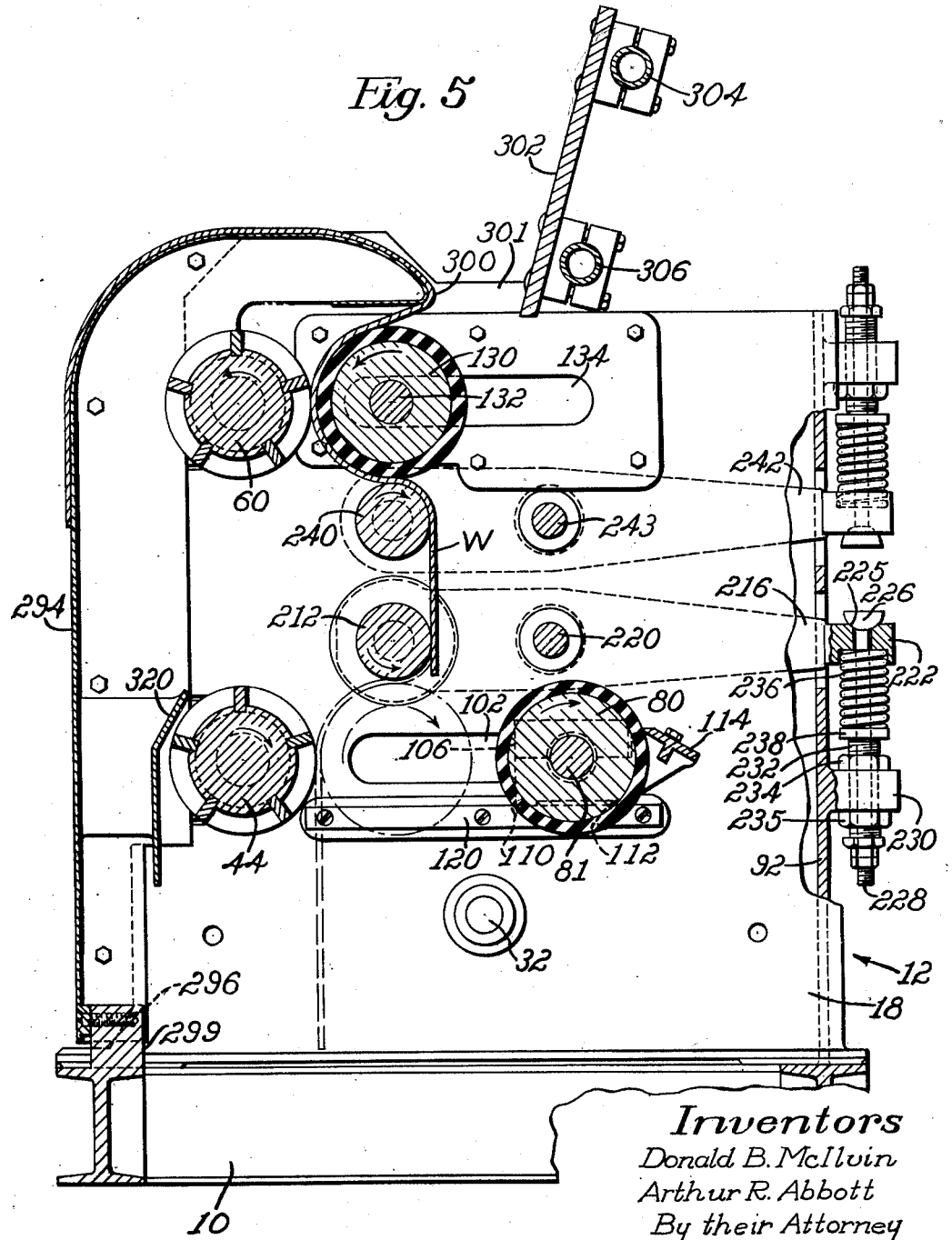

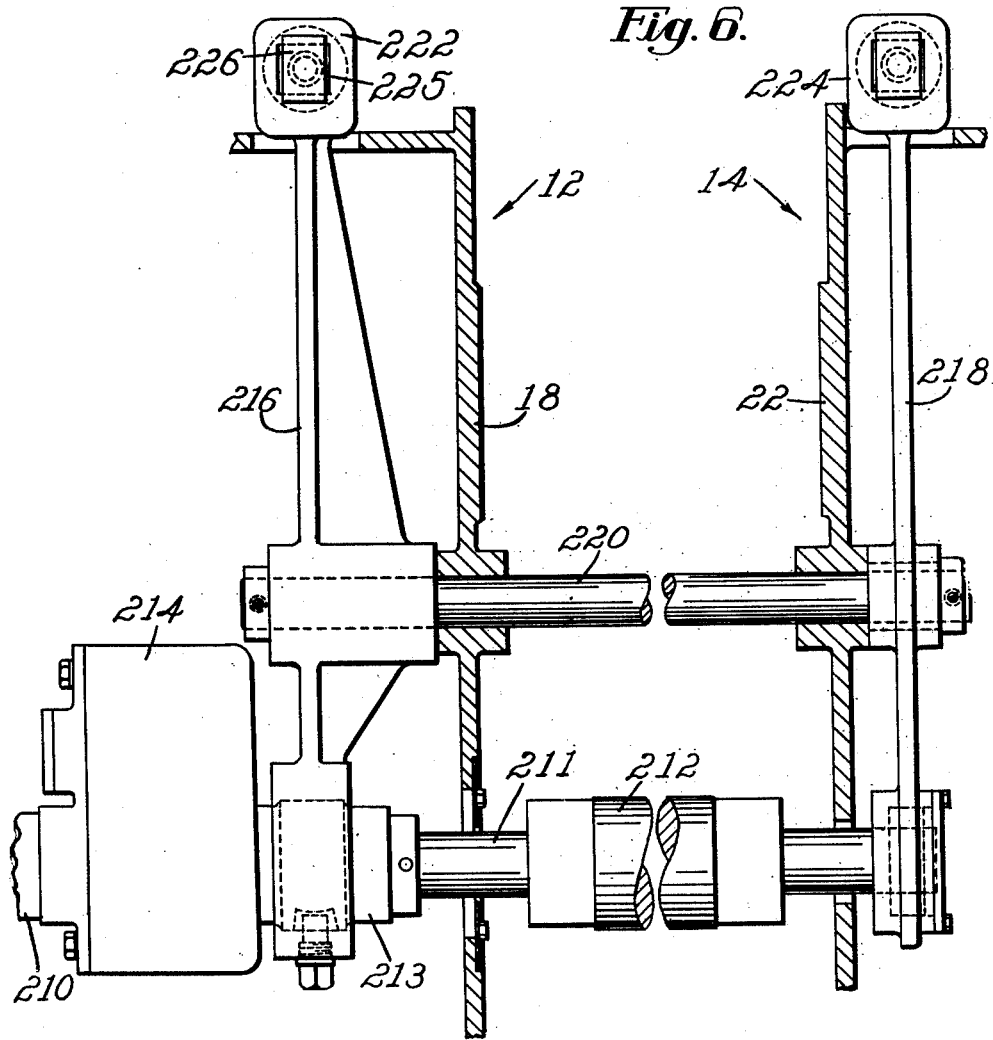

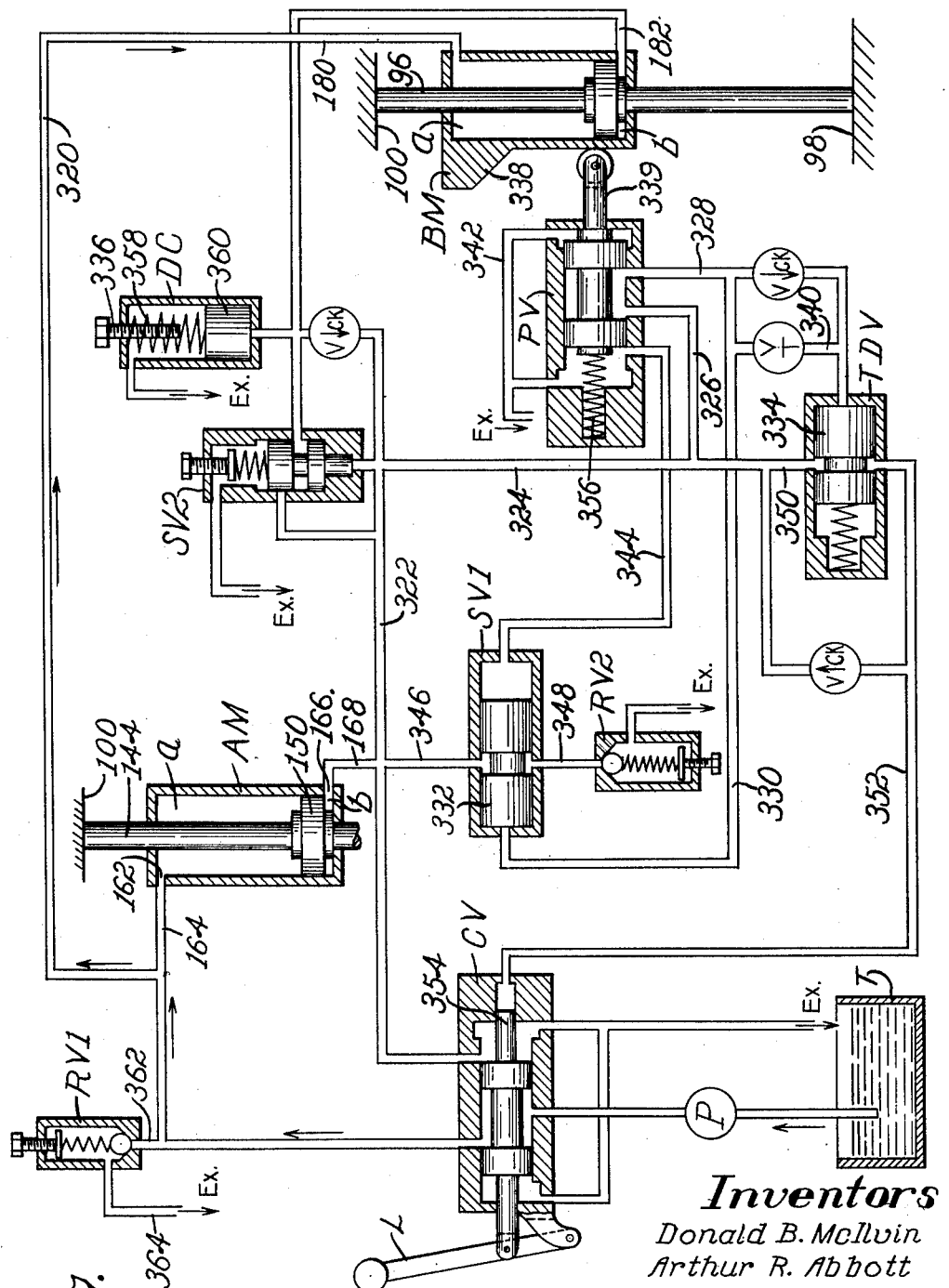

Patented May 5, 1953

2,637,193

UNITED STATES PATENT OFFICE 2,637,193

THROUGH-FEED MACHINE FOR TREATING SHEET MATERIALS

Donald B. McIlvin, Danvers, and Arthur R. Abbott, Beverly, Mass., assignors to United Shoe Machinery Corporation, Flemington, N. J., a corporation of New Jersey Application August 7, 1951, Serial No. 240,734

14 Claims. (Cl. 69—42)

This invention relates to improvements in machines for treating sheet materials such as hides, skins and leather, and more particularly to a through-feed machine using rotating work treating rolls in a novel arrangement preferably in combination with a casing at least partially enclosing the machine. The term "through-feed machine," as used in the present application and claims, refers to a machine capable of performing a complete operation on a work piece of sheet material during a single passage of the work piece through the machine. In the field of tanning, the novel and useful aspects of the invention are applicable for unhairing, glazing, putting out, fleshing and other operations.

In the tanning industry it is common practice for each of a number of machines to perform a given operation on one half of a work piece after which the operator is required to reverse the work piece end for end before recycling the machine to complete the treatment by presenting the remaining half of the work piece to the action of rotating work treating rolls. This reversal and recycling consumes considerable time and effort on the part of the operator.

A through-feed machine has been developed and is disclosed in United States Letters Patent No. 2,433,352, granted December 30, 1947, in the name of David Edgar, which machine increases the output considerably and with much less labor on the part of the operator.

Despite its advantages the machine of the patent referred to above requires the use of a clutch which is a source of expense, wear and mechanical difficulties and the arrangement for opening and closing the rolls is such that wear of the parts entails frequent and precise adjustment to maintain proper relation of the parts with respect to each other and a given work piece being treated. Also, despite a protective casing provided for the work treating rolls, an operator is subject to injury because of the necessary degree of exposure of moving parts, as arranged in the machine of the patent, to facilitate presentation and feeding of the work.

It is an object of the present invention to provide an improved through-feed machine having greater ease of operation, a minimum of maintenance difficulties and in the use of which substantially complete safety is afforded to the operator while presenting consecutive work pieces to the machine.

It is an important feature of the invention to provide a machine using rotating work treating rolls shielded from the operator by a casing and over which casing spread-out work pieces may be consecutively presented by him for treatment by the rolls. Another feature is an upwardly extending work guiding member located on the top of the machine and which, together with the above-mentioned casing, defines a slot through which work may be conveniently introduced for treatment. Still another feature is the arrangement of rolls which are preferably, but not necessarily, mounted for relative straight-line motion in opening and closing upon the work. One other feature is a novel arrangement of continuously rotatable rolls for a through-feed machine in combination with a casing for the machine which combination eliminates the possibility of injury or danger to the operator and the need of a clutch.

These and other important features of the invention will now be described in detail in the specification and pointed out in the appended claims.

In the drawings,

Fig. 4 is a sectional view along the line IV—IV of Fig. 1 and is drawn to a larger scale;

Fig. 5 is a view similar to that of Fig. 4 but with a work piece positioned in the machine during an early stage of its treatment;

Fig. 6 is a sectional view along the line VI—VI of Fig. 4 drawn to a larger scale; and Fig. 7 is a diagrammatic representation of the fluid pressure system for opening and closing the rolls of the machine.

Figure 1:
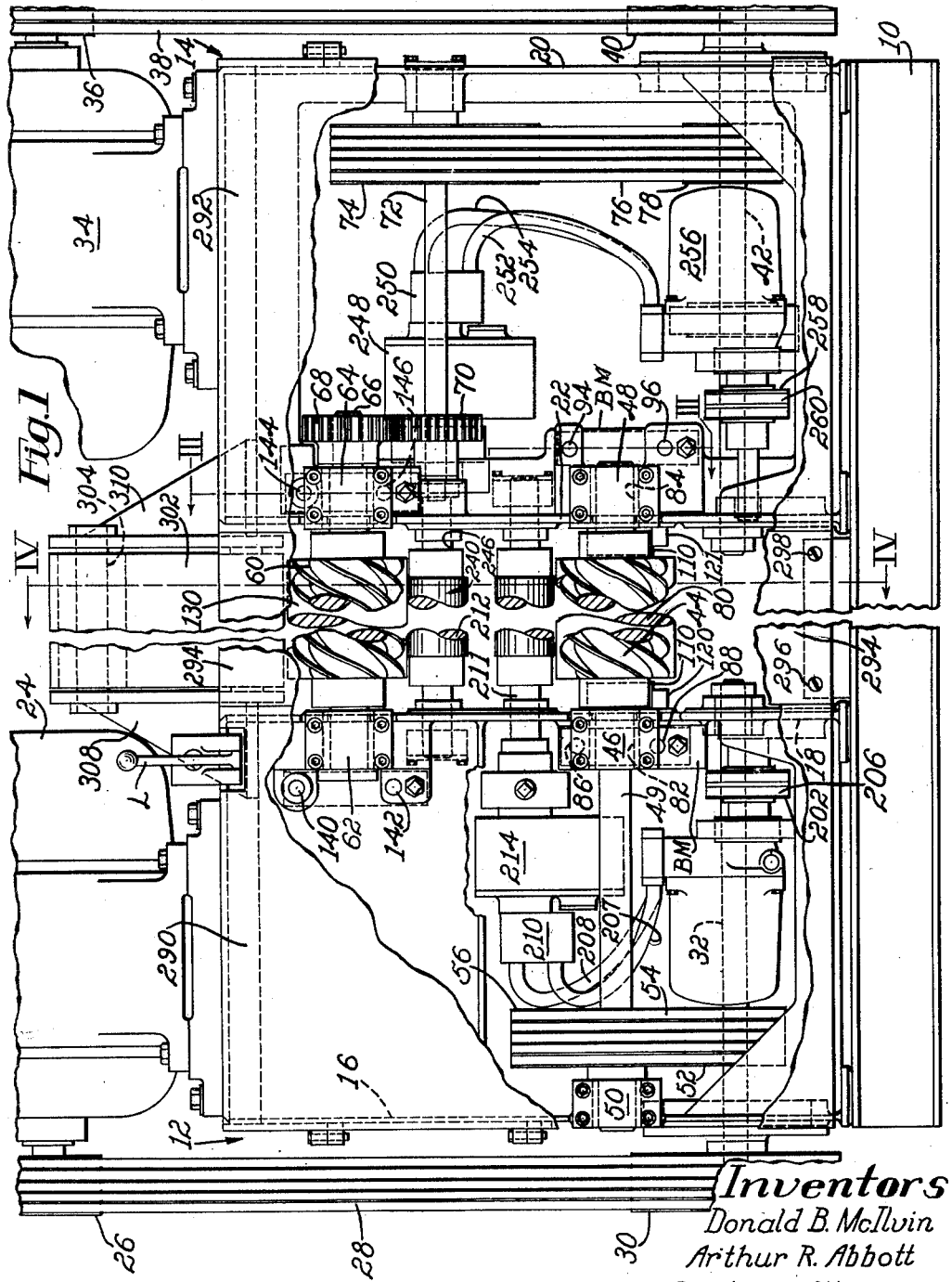
Fig. 1 is a front view of a machine embodying the present invention, with the central portion broken away.

This machine is of rugged construction and comprises a rectangular frame or base 10 fabricated from four I beams, and two casings 12 and 14 which are mounted on opposite ends of the base 10. The casing 12 is provided with an outer end wall 16 and an inner end wall 18 and the casing 14 is provided with an outer wall 20 and an inner wall 22.

Supported on the top of the casing 12 is a motor 24 (Fig. 1) which, by means of pulleys 26, belts 28 and pulleys 30, is adapted to drive a shaft 32 which passes through the casing 12 and is journaled in the walls 16 and 18.

On the top of the casing 14 is mounted a motor 34 (Fig. 1) which, by means of pulleys 36, belts 38 and pulleys 40, drives a shaft 42 which is journaled in the walls 20 and 22.

Between the two casings 12 and 14 is located a lower bladed work treating roll 44 which is journaled in bearings 46 and 48 (Fig. 1), the latter being located in the walls 18 and 22, respectively. Work treating roll 44 is provided with a shaft 49 which extends through the casing 12 and the end of which is journaled in a bearing 50 (Fig. 1) mounted on the wall 16 of the casing 12. The shaft 32 is adapted to drive the shaft 49 of the roll 44 by means of pulleys 52, belts 54 and pulleys 56.

Above the work treating roll 44 is a second and upper work treating roll 60 which is also mounted between the casings 12 and 14 and is carried in bearings 62 and 64 (Fig. 1) mounted in the walls 18 and 22, respectively. One end of the roll 60 has an extension 66 of its shaft located within the casing 14 and carries a gear 68 to rotate with it. Beneath the gear 68 and in driving engagement with it is a gear 70 which is keyed to a shaft 72 journaled in the walls 20 and 22. The shaft 72 carries a set of pulleys 74 which are driven by means of belts 76 from pulleys 78 attached to the shaft 42.

To the rear of the lower work treating roll 44 and in the same horizontal plane is located a lower bed roll 80 which is of conventional construction in that it bears a rubber covering and this roll is carried on a shaft 81. The bed roll shaft 81 is journaled at 82 and 84 (Fig. 1) in the main bodies or reciprocable portions of two motors BM. One motor BM is mounted within the casing 12 and is arranged to slide on two rods 86 and 88 which are supported by the front and back walls 90 and 92 of the casing 12. The other motor BM is located within the casing 14 and is arranged to slide on two rods 94 and 96 which are mounted in fixed relation to the walls 98 and 100 of the casing 14. The shaft 81 of the roll 80 passes through slots 102 (Fig. 4) and 104 (Fig. 3) of the walls 18 and 22. These slots provide clearances so that the shaft 81 can rotate freely despite horizontal bodily movement of the roll 80. Between each wall 18 and 22 and the corresponding ends of the roll 80 is a two-piece block 106 (only one is shown and is in Fig. 5), through which the shaft 81 is freely rotatable. The lower half of each block 106 serves as a bracket to support one end of a cleaning or scraping blade 114 the edge of which is arranged to clean the rubber surface of the roll 80 as the latter is rotated. The lower halves of each of the blocks 106 are provided with projections 110 and 112 which rest upon bars 120 and 121 which are attached to the walls 18 and 22. Only the bar 120 attached to the wall 18 is clearly shown in Figs. 4 and 5 but the opposed bar 121 (Fig. 1) is identical. These bars 120 permit motion of the blade 114 in a horizontal direction yet prevent the blade 114 from rotating with the roll 80. The roll 80 is rotated by a hydraulic motor and gear arrangement enclosed in the casing 14 and mounted on one of the motors BM and connected to drive one end of the shaft 81. To avoid confusion such motor and the necessary gear case are not shown in the drawings but the driving mechanism is similar to those which operate each of the feed rolls, as will be further described.

Figure 3:
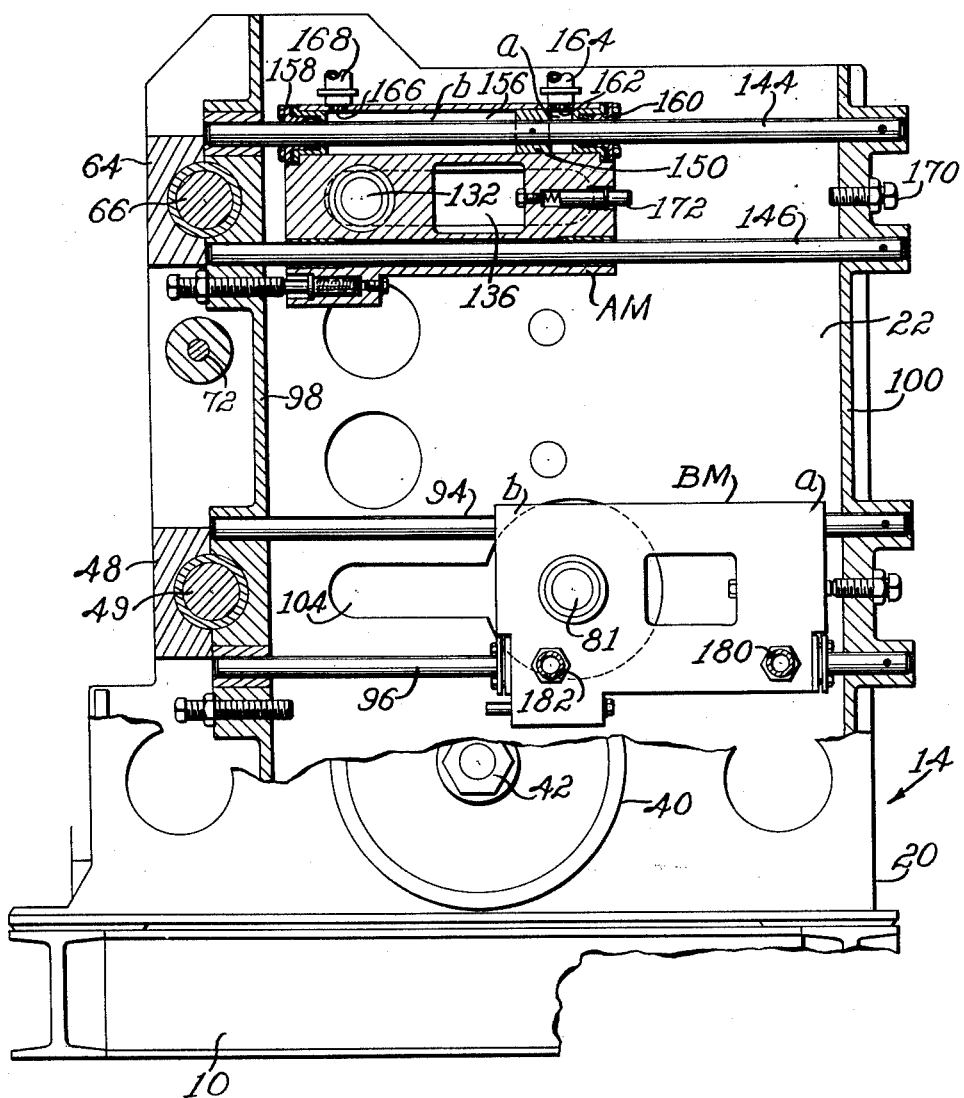
Fig. 3 is a view of the right-hand end of the machine, with a portion of the machine broken away along the line III—III of Fig. 1 and showing details of the power operated mechanism.

Above the bed roll 80 and in the same horizontal plane as the upper work treating roll 60 is a rubber covered bed roll or work backing member 130 the shaft 132 of which passes through slots 134 (Fig. 4) and 136 (Fig. 3) in the casing walls 18 and 22, respectively. The shaft 132 is journaled in the reciprocable portions of two motors AM, one of said motors being mounted in the casing 12 to slide upon rods 140 and 142 (Fig. 1). The other motor AM is in the casing 14 and slides upon two rods 144 and 146 (Figs. 1 and 3).

The four reciprocable motors AM and BM are all of the same construction and therefore only one motor is described herein. In Fig. 3 the sectional view of one motor AM discloses that the shaft 144 is provided with a fixed flange or piston 150 which is pinned to the shaft 144. This flange 150 occupies an annular space defined by the chamber 156 within the motor AM and the shaft 144. The ends of the chamber 156 are sealed by means of suitable stuffing boxes 158 and 160 through which the rod 144 may slide. The rear end $a$ of the chamber 156 bears a port 162 to which is connected a flexible conduit 164. The forward end $b$ of the chamber 156 is provided with a port 166 to which is connected a flexible conduit 168.

Between the two rods 144 and 146 and within the wall 100 is a stud 170 which is adjustably held in position so that its end may constitute a stop for a spring pressed plunger 172 mounted in the body of the motor AM. The forward or front end portion of the motor AM is similarly provided with stop means. The shaft 132 is driven as is the shaft 81 of the roll 80 but the driving means (hydraulic motor and gear arrangement) which is mounted in the casing 12 is not herein illustrated.

Each of the lower reciprocable motors BM is provided with a flexible coupling 180 connected to a port leading to the rear $a$ of the chamber of the motor BM and a second flexible conduit 182 leading to the forward end $b$ of the chamber.

Figure 2:
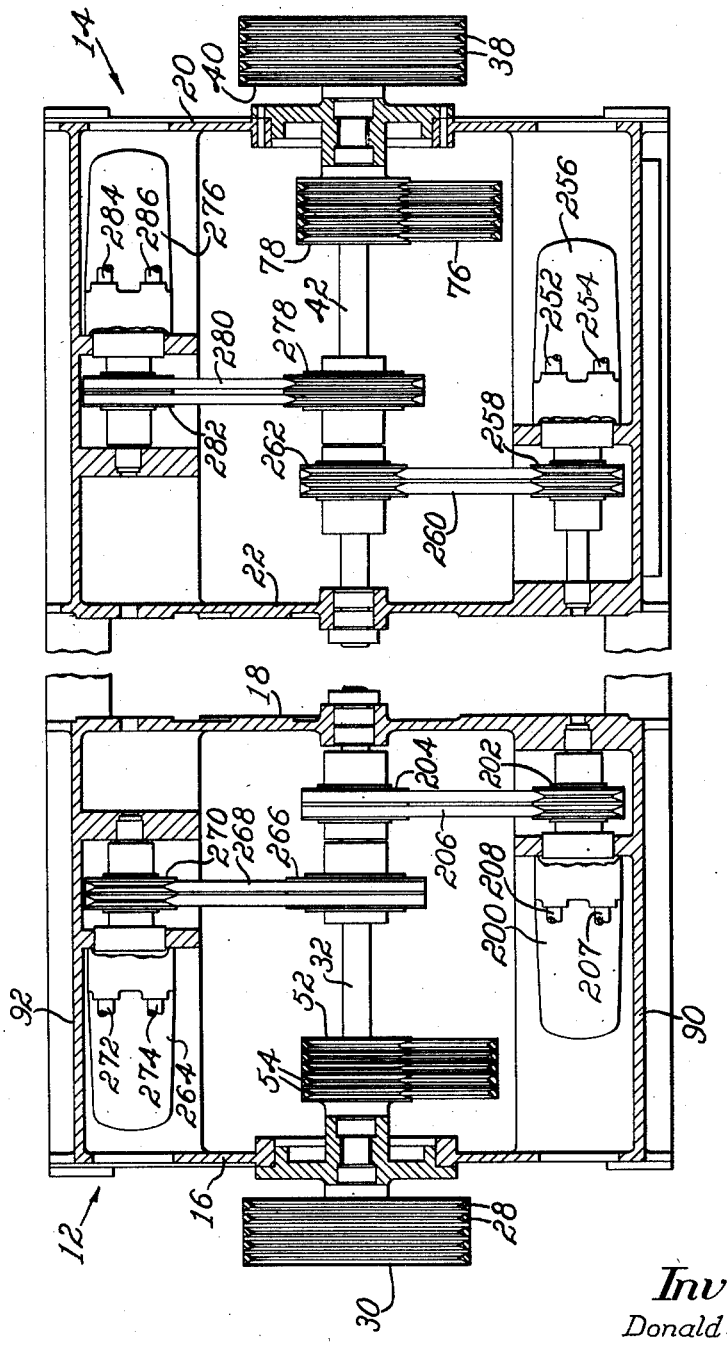
Fig. 2 is a horizontal sectional view through the bottom portion of the machine shown in Fig. 1.

Fig. 2, being a horizontal section through the bottom of the machine, illustrates that in each of the casings 12 and 14 are located two power pump units for converting electrical energy to hydraulic energy for driving those rolls which are bodily movable. One power pump unit 200 is provided in the front portion of the casing 12 and is driven by pulleys 202 and 204 and connecting belts 206 from the shaft 32. This power pump unit has flexible inlet and exit conduits 207 and 208 which lead to a fluid motor 210 (Fig. 1). The latter is arranged to drive the shaft 211 of a lower feed roll 212 by means of reducing gearing located in a gear box 214. The feed roll 212 as well as the gear box 214 and motor 210 are arranged to move in a small vertical arc as the shaft 211 of the feed roll 212 is journaled in the forward ends of two levers 216 and 218 (Fig. 6). These levers are arranged to pivot on a rod 220 which is journaled in hubs forming parts of the casing walls 18 and 22. Sufficient clearance is made in the walls 18 and 22 to permit slight vertical motion of the roll 212. Rearwardly of the casings 12 and 14 the arms 216 and 218 are enlarged to present rectangular blocks 222 and 224. The block 222 is provided with a milled recess 225 arranged to receive a head 226 of a threaded rod 228. The rear wall 92 is provided with a projection 230 through which a threaded sleeve 232 is adjustably held in position by means of nuts 234 and 235. A coil spring 233 is mounted concentric with the rod 228 and extends into a recess in the under side of the block 222 and the lower end of the spring 236 is held against a disk 238 which abuts against the end of the sleeve 232. The rectangular block 224 (Fig. 6) at the end of the lever 218 is similarly provided with a spring operated stop member.

The power pump unit 200 is a commercial unit and a suitable device of this nature is produced by Vickers Incorporated of Detroit, Michigan. It includes a pump, relief valve, filter, four-way valve and an oil reservoir or tank.

The fluid motor 210 is a commercial product manufactured by Eastern Industries, Inc. of New Haven, Conn.

The gearing and the gear box 214 may be of any conventional design and is constructed so that the shaft 211 of the driven roll 212 extends within the gear box for proper alinement and yet the box 214 is attached in nonrotative relation to the member or lever 216 through a sleeve 213 (Fig. 6) which is an integral part of the box 214.

It will be noted that the feed roll 212 is in such position that when the lower bed roll 80 comes into operative position with relation to the bladed roll 44, as shown in the dot-and-dash line in Fig. 5, it will cooperate with the latter in feeding work to the roll 44 and discharging treated portions of the work rearwardly.

Above the roll 212 and adjacent thereto is located a second or upper feed roll 240. This feed roll is mounted to rotate in the ends of two levers which are similar to the levers 216 and 218. Only one of these levers 242 is shown in the drawings but these are provided with spring devices, as in the case of the levers 216 and 218, and they are mounted to pivot on a rod 243 which is journaled in the walls 18 and 22 as is the rod 220. It will be noted that the feed or discharge rolls 212 and 240 are located between the work backing members 80 and 130 when the parts are in their operative or closed positions. The shaft 246 of the feed roll 240 extends into the casing 14 and is arranged to be driven by gearing in a gear casing 248 (Fig. 1) and a hydraulic motor 250. The latter is driven through the medium of two flexible conduits 252 and 254 from a power pump unit 256 which in all respects is similar to the power pump unit 200. The power pump unit 256 is driven by means of pulleys 258, belts 260 and pulleys 262 from the shaft 42.

Fig. 2 also shows a power pump unit 264 mounted within and at the rear of the casing 18 and adapted to be driven by the shaft 32 by means of pulleys 266, belts 268 and pulleys 270. Flexible conduits 272 and 274 are provided for driving a fluid motor and gears connected to drive the upper bed roll 130. This fluid motor and gears are not shown in the drawings but the motor is similar to the fluid motor 210 and the gears are in a casing similar to casing 214.

At the rear of the casing 14 is located a fourth power pump unit 276 which unit is driven from the shaft 42 by means of pulleys 278, belts 280 and pulleys 282. Flexible conduits 284 and 286 are provided from the unit 276 to drive a fluid motor and gearing attached to drive the lower bed roll 80.

The front of the casing 12 (Fig. 1) is provided with a protective door 290 which is hinged to the wall 16. The front of the casing 14 is provided with a door 292 which is hinged to the wall 20.

Between the two doors 290 and 292 and extending upwardly as a protective or safety shield for the rolls 44 and 60 is a casing 294 (Figs. 1 and 4) which is attached to the base 10 by means of screws 296 and 298 and a block 299 welded to the base. The casing 294 extends upwardly and over a portion of the top of the machine. It describes an arc over and to the rear of the bladed roll 60 to present a lip 300 over which the work (such as a work piece W in Fig. 5) is presented for treatment. Cooperating with the lip 300 to form a slot 301 through which the work may be presented is an upwardly extending work guiding member 302 which is held in position by means of suitable blocks and bolts on two horizontal tubes 304 and 306 (Fig. 4). These tubes 304 and 306 are supported on brackets 308 and 310 (Fig. 1) which are mounted upon the tops of the casings 12 and 14, respectively.

From the above description it is fairly clear how and in what cycle the machine is to be operated. The rolls 44, 60, 80 and 130 as well as the feed rolls 212 and 240—in fact all rolls—are arranged to be continuously rotated or operated by power regardless of whether or not the rolls are in work treating positions. Because of this feature no clutch is necessary and assuming the parts are in the positions shown in Fig. 4 and the rolls are all rotating, the operator, in complete safety need only present the leading end or portion of the work W over the casing 294 and the lip 300 so that the leading edge extends down between the rolls 60 and 130 and rearwardly of the feed roll 240.

As will be subsequently further explained the operator need only press a lever L (mounted on the front of the machine, in Fig. 1) forwardly with the result that the bed roll 130 moves forwardly by virtue of its motors AM into the position shown in Fig. 5 and the roll 130 thereby cooperates with the upper feed roll 240 to present the work W to the blades of the roll 60 and the trailing half of or portion of the work W is treated. Subsequent to the beginning of this treatment the leading edge of the work W extends down between the bladed roll 44 and the bed roll 80 and in the carrying out of the timed cycle of the machine's operation the bed roll 80 moves forwardly into the dot-and-dash position as shown in Fig. 5 and in cooperation with the feed roll 212 the leading half or portion of the work W is fed by the roll 44 and treated simultaneously with the treatment of the trailing portion of the work by the upper bladed roll 60.

As treatment proceeds, the two feed rolls or discharge rolls 212 and 240 continue to rotate in opposite directions (see arrows in Figs. 4 and 5) and serve to bend and discharge the intermediate portion of the work piece W rearwardly and ultimately the entire work piece, with one full side completely treated, drops down into the bottom portion of the machine where it may be caught on a shelf (not shown) or removed by some suitable instrumentality.

Fleshings or hairs, dependent upon the type of operation performed, as discharged from the upper bladed roll 60, are deflected from the lower roll 44 my means of a baffle plate 320 (Figs. 4 and 5) suitably located within the safety casing 294 of the machine.

A suitable control system for opening and closing the rolls is diagrammatically disclosed in Fig. 7 with the parts shown as positioned to correspond with the at-rest condition of the machine, i. e., with both bed rolls 80 and 130 in their rearmost or open positions as in Fig. 4 ready for a work piece to be introduced. While so positioned, oil flows from a supply tank T (which may be located within the base 10) by way of a pump P and through a control valve CV to one end a of each of the cylinders of motors AM and BM to hold the corresponding rolls 130 and 80 in their open or most rearward positions with a fluid pressure controlled by a relief valve RV1 which is arranged to return excess oil to the tank T. It is to be understood and in accordance with the earlier description that although Fig. 7 shows only one motor AM and one motor BM, there are two of each. Each set of two motors (AM or BM) is connected in parallel in the fluid pressure system and the motors AM are arranged to open and close the upper rolls 60, 130 and 240 and the motors BM are adapted to open and close the lower rolls 44, 80 and 212.

Assuming that shafts 32 and 42 are being rotated by electric motors 24 and 34 and all the rolls are being rotated constantly in the directions shown by the arrows in Figs. 4 and 5, and the operator has inserted the leading portion of a work piece W down and between the two upper rolls 60 and 130, the machine cycle is initiated by the operator pushing the lever L rearwardly (Fig. 1) or to the right as viewed in Fig. 7, thus causing the four-way valve CV to direct oil to the end $b$ of the motor AM cylinder and to open the ends $a$ of the motor AM and BM to exhaust oil by way of lines 164 and 320 back to the tank T. As oil flows by way of line 168 into the cylinder of motor AM at end $b$ and pressure begins to build up at that end, it also flows through the mechanically operated 4-way pilot valve PV by way of lines 322, 324 and 326 as well as lines 328 and 330 to the left-hand end of the fluid-pressure operated 4-way shuttle valve SV1 to move the two-land spindle 332 thereof to the right, blocking off the flow through it from the line 322 to a relief valve RV2. This also causes oil to flow to the right-hand end of the piston 334 in the time delay valve TDV moving that piston to the left.

When the motor AM has completed its stroke and the upper bed roll 130 of the machine is therefor in operative or closed position, the pressure in lines 322 and 182 builds up to a predetermined value as set by a sequence valve SV2 through which oil flows to a displacement cylinder DC, the volume of which is adjustable by means of a threaded screw 336. The purpose of the cylinder DC is to vary the displacement time interval between the operation of cylinder motors AM and BM by increasing or decreasing the volume of oil required to satisfy the demand to close the line leading to the end $b$ of the motor BM cylinder.

As the motor BM nears completion of its stroke and the lower rollers 44, 80 and 212 of the machine near operative relation or become almost closed, a cam surface 338 on the motor BM serves to move the spindle 339 of the valve PV to the left. This initiates the time delay cycle of the valve TDV by opening the lines 340, 330, 328 and 342 leading from the valve TDV to exhaust by way of the throttle valve VT. The action of the cam surface 333 also serves to direct oil flow to the right-hand end of the shuttle valve SV1 by way of line 344 permitting flow through lines 346 and 348 to the relief valve RV2. This relief allows the pump P to discharge through the valve SV1 at a reduced back pressure during the delay time interval, decreases power requirements and minimizes heating of the oil.

Upon completion of the delay period, valve TDV permits oil to flow through it and by means of lines 350 and 352 to the right-hand end of the control valve CV, driving the spindle 354 thereof to the left, opening the lines 168 and 182 to the ends $b$ of motors AM and BM to exhaust and directing the flow to ends $a$ of the motors to return the motors to the positions as shown in Fig. 7 with both upper and lower rolls in inoperative or open positions as in Fig. 4.

As each motor BM restracts, the pilot valve PV resets by withdrawal of the cam and the action of a spring 356. The displacement cylinder DC also discharges its oil to exhaust under influence of a spring 358 as exerted against the piston 360 therein. When both motors AM and BM are fully retracted, the excess oil again discharges through lines 362 and 364 against the back pressure of the relief valve RV1 and the cycle is completed with the machine at rest in so far as linear motion of the rotating rolls of the machine is concerned and with the rolls as positioned in Fig. 4.

If at any time during the cycle it becomes desirable to terminate the operation, by manually pulling the lever L, the operator can return the system to the at-rest condition with the machine prepared for a subsequent operation.

From the above it may be understood that the machine provides an arrangement of rotating rolls to which individual pieces of work may be presented consecutively by an operator without stopping the rotation of any of the rolls and yet the presentation may be undertaken with full control of the disposition and spreading of the work and with complete safety in so far as the operator is concerned. It is also to be noted that the bed rolls 80 and 130 move with straight line motions in opening and closing and, because of this arrangement, and despite wear of the bladed rolls 44 or 60 as well as the bed rolls 80 and 130 (causing reduced diameters of those rolls), compensatory adjustment is not difficult and need not be as precise as when the rolls open and close by arcuate movements.

Having thus described our invention, what we claim as new and desire to secure by Letters Patent of the United States is:

1. In a through-feed machine for treating sheet material such as hides and skins, a casing presenting a work supporting surface over which spread-out work pieces may be consecutively presented, said surface extending above and terminating beyond the work treating zone of the machine, and means for feeding each of said work pieces through said zone as the leading edge thereof depends from said surface.

2. In a through-feed machine for treating sheet material such as hides and skins, a casing over which spread-out work pieces may be consecutively presented from the front of the machine, said casing covering a work treatment zone in the machine and having a lip portion at the rear of said zone, and means for receiving and feeding each of said work pieces through said zone subsequent to the leading edge thereof being dependent from said lip.

3. In a through-feed machine for treating sheet material, work treating means located near the front of the machine, a casing extending in front and over said work treating means, and means for feeding a work piece supported by said casing to said means subsequent to the presentation of said work piece over the casing.

4. In a through-feed machine for treating sheet material, work treating rolls located near the front of the machine, a casing extending up the front and over the top and to the rear of said rolls, an upwardly extending work guiding member spaced rearwardly from said casing to form a work receiving slot, and bed rolls beneath said member for presenting a work piece being fed through the slot to the action of said rolls.

5. In a through-feed machine for treating sheet material, a work treating roll located near the front of the machine, a casing extending over the top and to the rear of said roll, an upwardly extending work guiding member spaced rearwardly from said casing to form a work receiving slot, and means for engaging a work piece as presented through the slot and pressing it against the said roll.

6. In a through-feed machine for treating sheet material, two sets of cooperating rolls, each set including a work treating roll located near the front of the machine, a discharge roll and a bed roll, a casing extending over the top and to the rear of said work treating rolls, an upwardly extending work guiding member spaced rearwardly from said casing to form a work receiving slot, and means for supporting each of the said bed rolls for straight line motion between a position of operative relation with its corresponding work treating roll and a position rearwardly of the casing.

7. In a through-feed machine for treating sheet material, two sets of horizontal cooperating rolls, each set including a work treating roll, a discharge roll and a bed roll, the two discharge rolls being adjacent each other, the two work treating rolls being near the front of the machine with one above the other, a casing extending in front of and above and to the rear of the upper work treating roll, and means for moving each bed roll into its operative position with respect to the other rolls of its set in a predetermined sequence.

8. In a through-feed machine for treating sheet material, two parallel work treating rolls located along the front of the machine with one above the other and the upper roll being covered by a casing, a discharge roll yieldingly mounted to the rear of each treating roll, a first bed roll at the rear of the upper treating roll and adapted to hold a work piece in engagement with said upper roll and the corresponding discharge roll, a second bed roll at the rear of the lower treating roll and adapted to hold said work piece in engagement with the said lower roll and its discharge roll, the two discharge rolls being arranged upon rotation in opposite directions to bend and discharge the work piece rearwardly, and means for moving each bed roll into and away from its operative position by straight line motion.

9. In a through-feed machine for treating sheet material, two work treating rolls, a discharge roll adjacent to each work treating roll, a first bed roll at one side of said two treating rolls and adapted to hold an end portion of a work piece in engagement with one of said treating rolls and its adjacent discharge roll, and a second bed roll for holding the other end portion of the said work piece in engagement with the other treating roll and its adjacent discharge roll, the two discharge rolls being adjacent to each other and located between the bed rolls when the latter are in operative positions, and said discharge rolls being arranged upon rotation in opposite directions to bend and discharge an intermediate portion of the work piece away from them as said end portions are being treated.

10. In a through-feed machine for treating sheet material, two parallel work treating rolls one being located above the other, a discharge roll to the rear of each treating roll, a first bed roll at the rear of the upper treating roll and adapted to hold a work piece in engagement with said upper roll and the corresponding discharge roll, a second bed roll at the rear of the lower treating roll adapted to hold said work piece in engagement with the said lower roll and its discharge roll, the two discharge rolls being arranged upon rotation in opposite directions to bend and discharge the intermediate portion of the work piece rearwardly, means for moving each bed roll into and away from its operative position, and a casing extending in front of and above and to the rear of the upper work treating roll.

11. In a through-feed machine for treating sheet material, a casing for the machine extending up in front of the machine and over a portion of the top thereof and terminating in a discharge lip, two sets of horizontal cooperating rolls within said casing, one set being arranged to treat a rearmost portion of a work piece fed over said lip, the second set of rolls being arranged to treat the remainder of said work piece.

12. In a through-feed machine for treating sheet material, a casing for said machine having a slot through which a work piece may be presented in spread-out condition, two sets of cooperating rolls within said casing for treating said work piece, and means for bringing the two sets of rolls into effective operative positions at relatively predetermined times to secure complete treatment of said work piece.

13. In a through-feed machine for treating sheet material, a casing covering the front and a portion of the top of said machine, bladed work treating rolls arranged to be continuously rotated and located in fixed positions within said casing, additional rolls for feeding a work piece presented over the casing in spread-out condition to said treating rolls, and means for moving the additional rolls into operative positions with respect to the bladed rolls in a predetermined sequence to effect complete treatment of said work piece.

14. In a through-feed machine for treating sheet material including two end walls, two sets of horizontal cooperating tools mounted in parallel relation between said walls, each set including a bladed roll, a work backing member and a discharge roll, the two bladed rolls being fixedly mounted one over the other, the two discharge rolls being adjacent each other and mounted between said work backing members while the latter are in their operative positions, and means for moving the said work backing members away from their operative positions.

DONALD B. McILVIN.
ARTHUR R. ABBOTT.

References Cited in the file of this patent

UNITED STATES PATENTS

| Number | Name | Date |
| --- | --- | --- |
| 2,433,352 | Edgar | Dec. 30, 1947 |